Jan. 13, 1942.    J. M. COONEY    2,269,650
MEASURING APPARATUS
Filed May 15, 1940    2 Sheets-Sheet 1
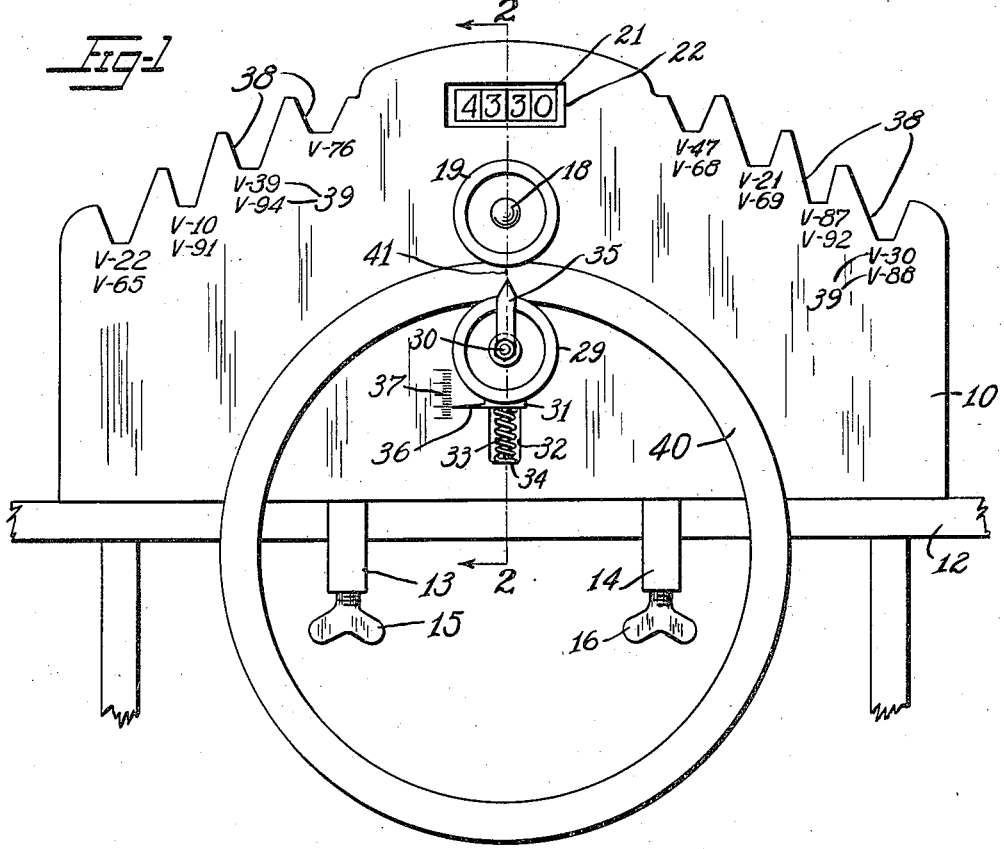
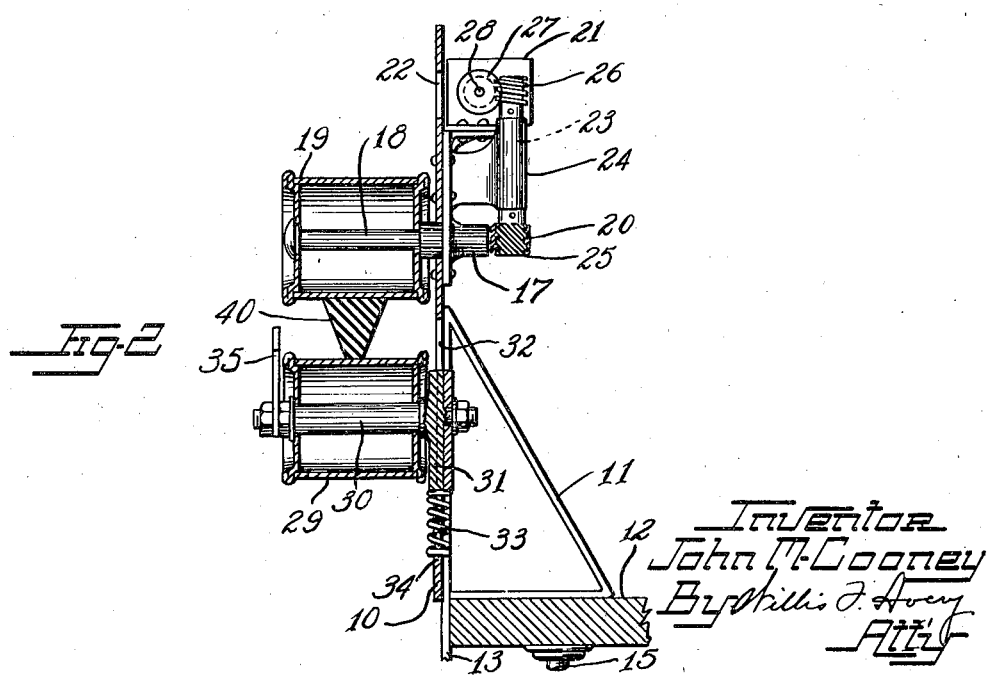
Inventor
John M. Cooney Jan. 13, 1942.  J. M. COONEY  2,269,650
MEASURING APPARATUS
Filed May 15, 1940  2 Sheets-Sheet 2
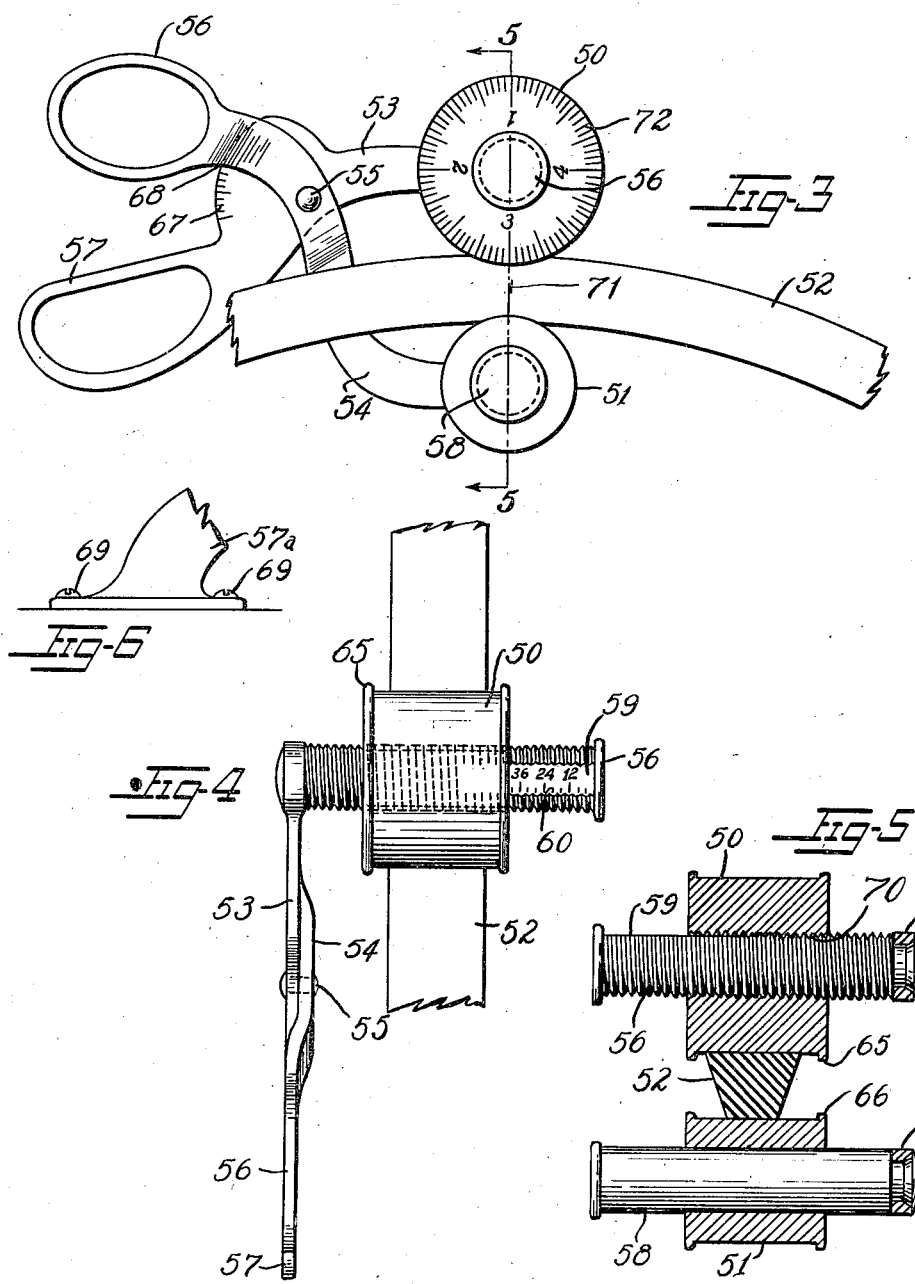

Patented Jan. 13, 1942

2,269,650

UNITED STATES PATENT OFFICE 2,269,650

MEASURING APPARATUS

John M. Cooney, Cincinnati, Ohio, assignor to The B. F. Goodrich Company, New York, N. Y., a corporation of New York Application May 15, 1940, Serial No. 335,282

2 Claims. (Cl. 33—141.5)

This invention relates to measuring apparatus and more particularly to apparatus for measuring the linear dimensions and thickness of endless articles of strip material. The apparatus is especially useful in measuring endless belts of the side-driving type.

Endless belts of the side-driving type are used in great quantities for the driving of washing machines, refrigerators, and other mechanical household appliances. As these belts become worn they must be replaced and it is desirable to provide apparatus whereby the dimensions of the old belt may be determined so that a new belt of the proper size is supplied.

The principal objects of this invention are to provide a simple, inexpensive apparatus whereby the dimensions of the belt may be accurately determined, to provide portability, simplicity of construction, and efficiency of operation. These and other objects will appear from the following description and the accompanying drawings.

Of the drawings:

Fig. 1 is a front elevation of the apparatus in one of its forms, the apparatus being shown as clamped to a table, part of the table being broken away;

Fig. 2 is a sectional elevation thereof taken on line 2—2 of Fig. 1;

Fig. 3 is an elevation of another form of the invention showing the apparatus in use in measuring a V-belt of the side driving type, part of the belt being broken away;

Fig. 4 is a plan view of the same;

Fig. 5 is a section thereof taken on line 5—5 of Fig. 3; and

Fig. 6 is a detailed view showing a modification of one of the handles whereby the apparatus may be attached to a stationary support.

Referring to the drawings, the invention generally comprises a pair of rotatable discs adapted to engage the belt, or other object to be measured, therebetween with means for adjusting the rotatable members into contact with the object and means for recording the rotation of one of the rotatable members as the object to be measured is drawn therebetween, means also being provided for determining the lateral dimensions of the object.

Referring to Figs. 1 and 2 which illustrate a form of the invention suitable for attachment to a table, shelf, or other support, the numeral 10 designates a plate-like frame member having one or more pedestal brackets 11 attached thereto for the purpose of supporting it from the table 12. A plurality of C-clamps 13, 14 integral with the plate 10, extend about the edge of the table and are provided with clamp screws 15, 16 whereby the apparatus may be secured to the table top. The frame 10 is provided with a horizontal bearing 17 in which a shaft 18 is rotatably mounted. One end of the shaft has fixed thereto, a rotatable drum-like member 19 and the other end of the shaft has fixed thereto a spiral gear 20. A tachometer 21 for recording the rotation of the shaft 18 is fixed to the frame 10 preferably behind a window aperture 22 formed therein and is operatively connected with the shaft 18 by a vertically disposed shaft 23 rotatably mounted in a bearing member 24 attached to the frame 10, and having a spiral gear 25 attached to one end thereof in a position to mesh with the gear 20 and a worm 26 attached to the other end for meshing with a worm gear 27 fixed to the shaft 28 of the tachometer.

For supporting the belt in driving relation to the drum 19, a second drum 29 is rotatably mounted therebelow upon a shaft 30 parallel thereto. Shaft 30 is fixed to a carriage 31 slideably mounted in a vertical direction on the frame 10 as by engaging in a vertical slot 32 formed therein. A coil spring 33 is mounted between the carriage 31 and a fixed abutment 34 formed on the frame 10 and acts to press the drum 29 toward the drum 19. An index finger 35 is attached to the shaft 30 so as to be positioned adjacent one side of the article to be measured. A second index finger 36 extends from the carriage 31 over the face of the frame 10 and a scale 37 is engraved or otherwise provided on the frame 10 for indicating the distance between the faces of the drums 19 and 29 when they are engaged in contact with a belt or other article to be measured thereby indicating at a glance the depth or thickness of the article.

The frame 10 may be provided with gauge notches 38 formed in the edge thereof for gauging the width and angular dimensions of belts, and designating numerals 39 may be provided at the notches for indicating the catalog number or style of the belt.

In the operation of the apparatus the rotatable member 29 is depressed against the spring 33 enough to permit the placing of a belt 40 between the rotatable members. A zero mark 41 is placed on the belt at the position of index finger 35 and the belt is then drawn between the rotatable members until the zero mark again coincides with its initial position. The difference in readings of the tachometer of these two positions will be an accurate indication of the length of the belt or other article. The tachometer may be of such a type as to read directly the linear measure of the belt and may be set at zero reading by well known resetting mechanism or by rotation of the drum 19 at the start of each measuring operation, or readings may be taken at the initial and final positions of the belt and one subtracted from the other to obtain the length of the belt.

Referring to Figs. 3 to 6 which illustrate another form of the invention, the numeral 50 designates the rotatable measuring drum and the numeral 51 a rotatable cooperative drum parallel thereto between which the belt 52 may be engaged for measuring purposes. The rotatable drums 50 and 51 are mounted upon a scissor-like frame comprising scissor arms 53 and 54 pivoted to each other at 55 and having handles 56, 57 which may be engaged by the hand of the operator. The drum 51 is rotatably mounted on a shaft 58 fixed to the scissor arm 54 and is also mounted to slide thereon in an axial direction. The drum 50 has a threaded bore 70 adapted to engage a threaded shaft 56 fixed to the scissor arm 53. The arrangement is such that as the drum 50 is rotated about the threaded shaft it is also moved axially thereof. A portion of the shaft 56 is flattened as at 59 and engraved as at 60 to provide a scale indicating the axial travel of the drum in its rotative movement.

In the use of the apparatus the handles 56 and 57 are gripped by one hand of the operator with the belt 52 between the drums 50, 51. A zero mark 71 is placed on the side of the belt and this is aligned with a graduation on the face of the drum 50, the face of the drum being graduated as at 72 to indicate fractions of an inch or other convenient linear measurement. At zero position the cylinder 50 is preferably at or near one end of the screw shaft and the belt is then drawn between the rotatable drums by the other hand of the operator in a direction to cause the drum 50 to travel toward the other end of the threaded shaft. When the zero line 71 again appears at a position between the drums 50, 51 the number of complete rotations of the drum 50 may be read directly from the scale 60 and any fractional rotation thereof may be read from a scale 72 on the face of the drum and the length of the belt accurately determined therefrom. The drum 50 is preferably made of such a circumference as to be a multiple of a convenient measuring unit and the threads on the shaft are preferably made of such a pitch as to make reading of the scale 60 an even number of inches or other units per revolution. To provide for keeping the drums in contact with the belt the drums are preferably provided with flanges at their margins 65 and 66.

To provide for measuring the thickness of the belt or other article, a scale 67 is formed on one of the scissor arms 53 and is adapted to cooperate with an edge 68 of the scissor arm 54 as an index of the thickness of the belt. This form of the apparatus may be attached to a table or other support by eliminating the handle 57 and providing an arm 57a (see Fig. 6) in place thereof, the arm 57a being attached to the support by screws 69.

Variations of the invention may be made without departing from the spirit of the invention as it is defined by the following claims.

I claim:

1. Apparatus for measuring endless belts and other flexible elongate articles, said apparatus comprising a pair of pivoted scissor handles, a shaft rigidly mounted on one of the handles at its end opposite the grip, a rotatable drum member mounted on said shaft for rotative and axial movement with respect thereto, a threaded shaft mounted at the corresponding end of the other handle parallel to said first shaft, a measuring drum having a threaded bore and engageable with said threaded shaft and means on said threaded shaft and said last named drum for indicating the extent of rotation of the drum.

2. Apparatus for measuring belts or other elongate articles, said apparatus comprising a pair of rotatable drums, a pair of scissor handles for respectively supporting said drums for pressing one of said drums toward the other, means associated with one of said drums for moving it axially along its support by reason of its rotative movement, the axial movement being proportional to the rotative movement thereof and means associated with said last-named drum for indicating the extent of its rotative and axial movements.

JOHN M. COONEY.